E. T. HOSKINS & J. H. BURPEE.
STEAM COOKER.
APPLICATION FILED FEB. 24, 1915.

1,171,339.

Patented Feb. 8, 1916.
4 SHEETS—SHEET 1.

WITNESSES:
OJohnson
Frank Warren

INVENTORS
Eugene T. Hoskins
John H. Burpee.
BY
C.O. Haskins
ATTORNEY

E. T. HOSKINS & J. H. BURPEE.
STEAM COOKER.
APPLICATION FILED FEB. 24, 1915.
1,171,339.
Patented Feb. 8, 1916.
4 SHEETS—SHEET 3.
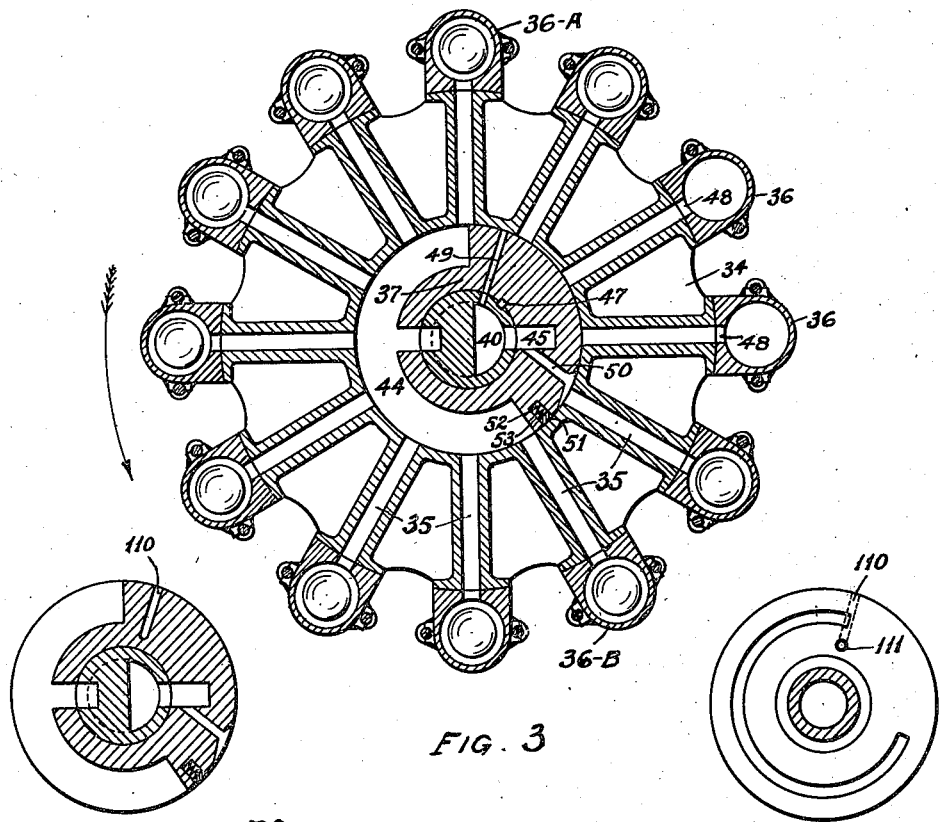
FIG. 3
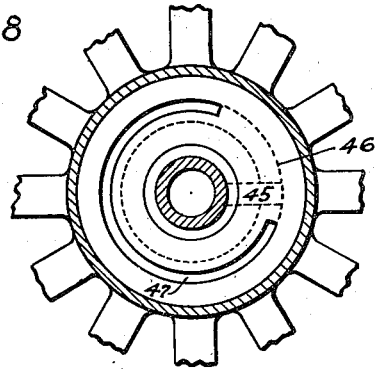
FIG. 8
FIG. 9
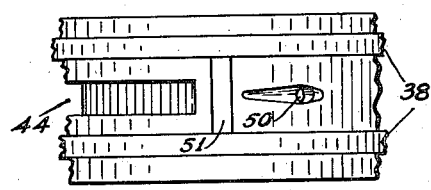
FIG. 4
FIG. 5
WITNESSES:
OJohnson
Frank Warren
INVENTORS
Eugene T. Hoskins
John H. Burpee
BY
C.D. Haskins
ATTORNEY

UNITED STATES PATENT OFFICE.

EUGENE T. HOSKINS, OF SEATTLE, AND JOHN H. BURPEE, OF BELLINGHAM, WASHINGTON.

STEAM-COOKER.

1,171,339.    Specification of Letters Patent.    Patented Feb. 8, 1916.

Application filed February 24, 1915. Serial No. 10,366.

*To all whom it may concern:*

Be it known that we, EUGENE T. HOSKINS, a citizen of the United States, residing at Seattle, in the county of King and State of Washington, and JOHN H. BURPEE, a citizen of the Dominion of Canada, residing at Bellingham, in the county of Whatcom and State of Washington, have invented a certain new and useful Improvement in Steam-Cookers, of which the following is a specification.

Our invention relates to improvements in steam cookers, which are sometimes termed "exhaust boxes" and which are employed in the operation of cooking or heating food products after such products are disposed within cans, in which operation the air remaining in the cans containing such products is exhausted to prepare them for the immediate operation of hermetically sealing them; and the object of our improvement is to provide a machine that may be actuated by power communicated to it from a suitable motor and which shall embody a plurality of chambers into each of which may be conveyed automatically a can of food products whereupon such chamber shall be automatically closed and then supplied with steam under high pressure thus to subject the contents of such can to a high temperature for a predetermined period of time for its proper treatment whereupon such chamber shall automatically open and then the can shall be ejected therefrom and be deposited upon a conveyer to be carried to a desired distant point, leaving such chamber ready to receive a succeeding can for like treatment. We attain this object by devices illustrated in the accompanying drawings wherein—

Figure 1:
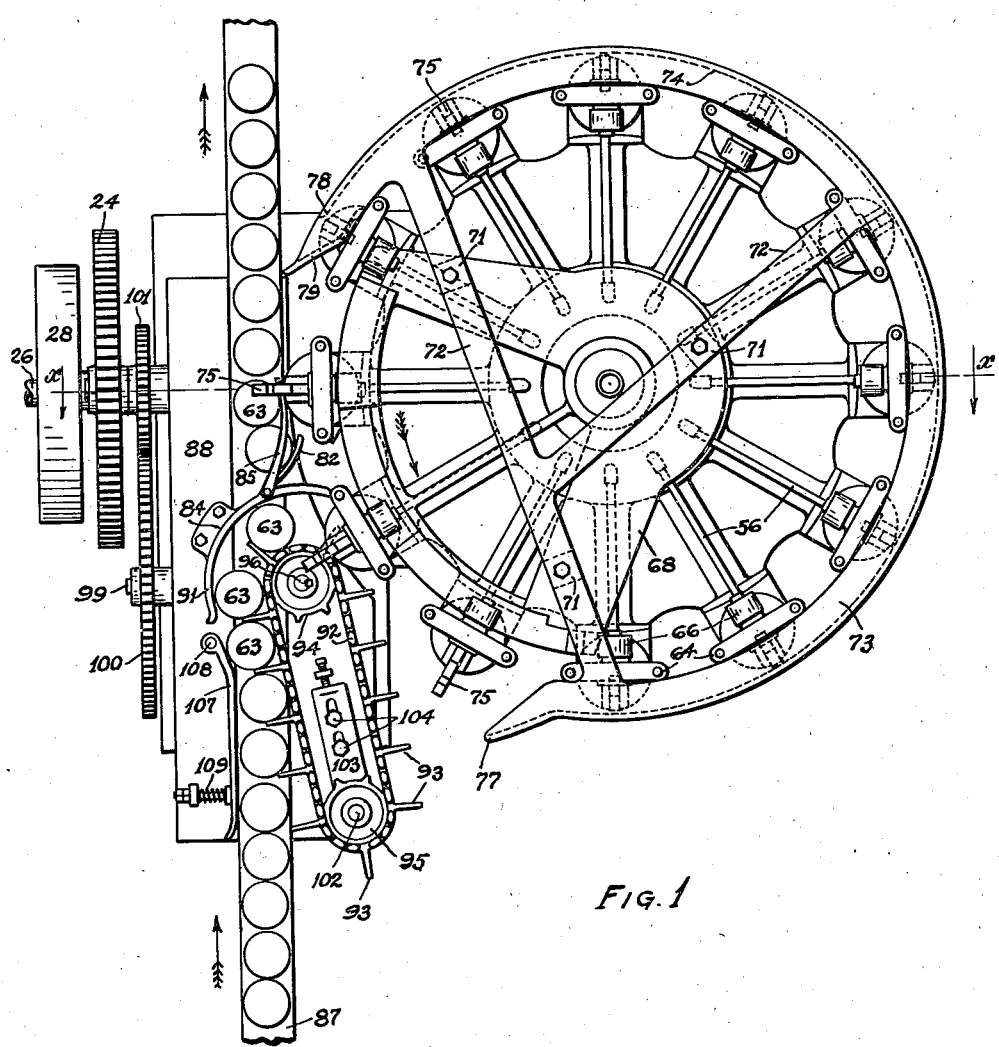
Figure 2:
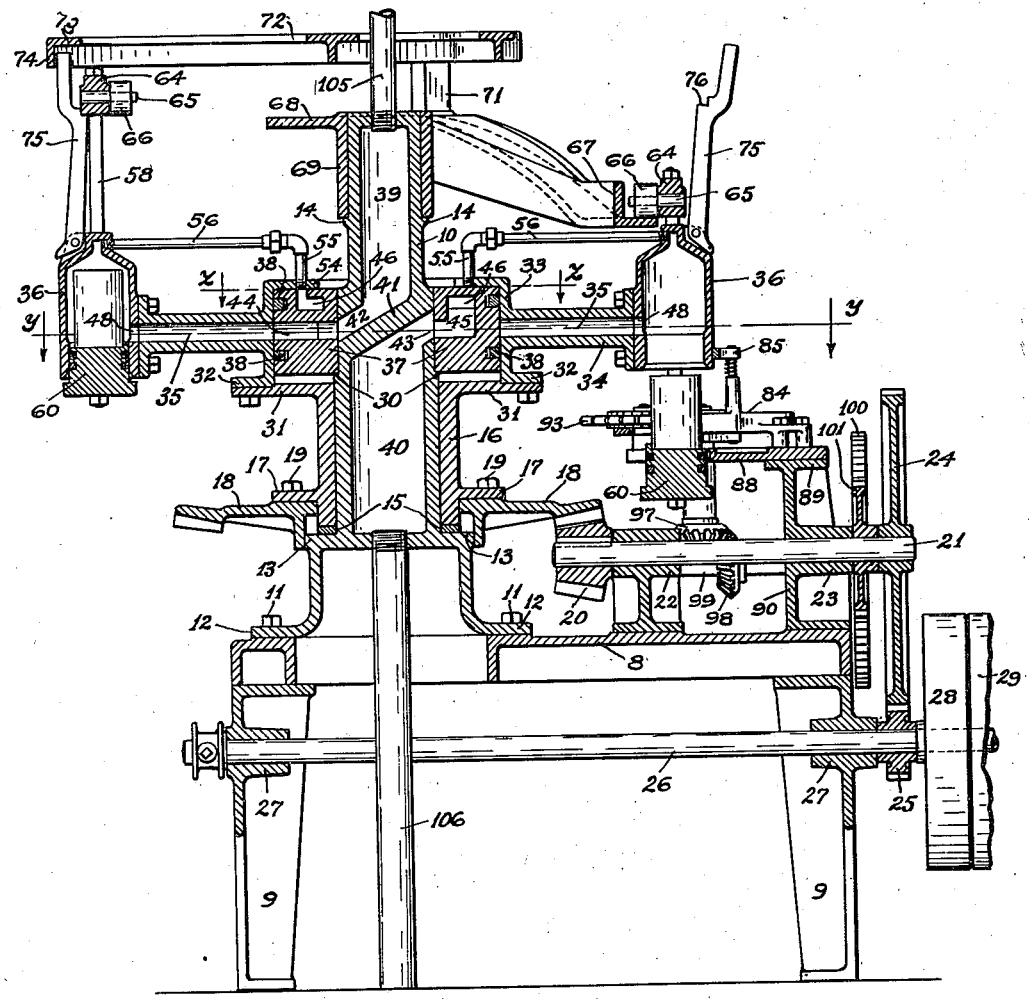
Figure 6:
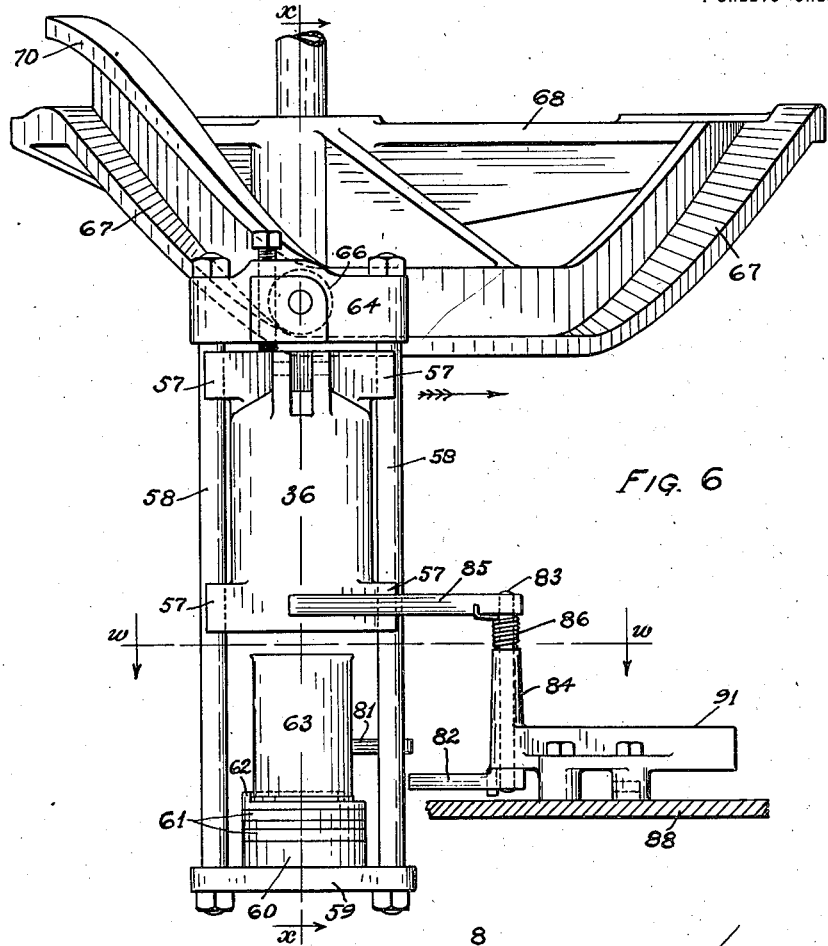
Figure 7:
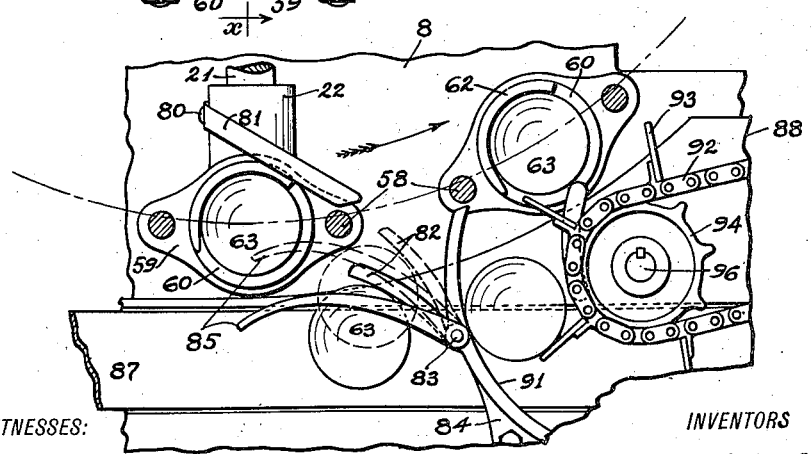

Figure 1 is a plan view of the operative parts of a machine embodying our invention; Fig. 2 is a view of the same in vertical section on broken lines *x, x* of Figs. 1 and 6; Fig. 3 is a view in horizontal section of parts of the same on broken line *y, y* of Fig. 2; Fig. 4 is a view in horizontal section of other parts of the same on broken line *z, z* of Fig. 2; Fig. 5 is a view in side elevation of a fragment of a detail of the same; Fig. 6 is a view in side elevation of parts of the same; Fig. 7 is a plan view on broken line *w, w* of Fig. 6 showing some other parts in addition to the parts shown in Fig. 6; and Figs. 8 and 9 illustrate a modified form of a detail of our invention.

Referring to the drawings, throughout which like reference numerals indicate like parts, as shown in Fig. 2 a bed plate 8 is secured to rest upon supports 9 and integrally fixed upon the bed plate 8 to extend vertically upward therefrom is a hollow pivotal shaft 10, preferably of cast-iron, whose flanged bottom 12 is secured by bolts 11 and such pivotal shaft 10 is provided with a lower shoulder 13, an upper shoulder 14 and an intermediate shoulder 30.

Surrounding the pivotal shaft 10 to rest upon the shoulder 13 is a thrust washer 15, preferably of bronze, and rotatably disposed on said pivotal shaft 10 is a sleeve 16 whose lower edge rests upon said thrust washer 15 and such sleeve 16, near its lower end, is provided with an integral flange 17 to the underside of which is secured a beveled gearwheel 18 by means of bolts 19.

The beveled gearwheel 18 is adapted to be rotated in response to the rotation of a bevel pinion 20 with which it meshes, said pinion 20 being securely mounted on one end portion of a shaft 21 which is rotatably disposed in bearings 22 and 23 which are secured to the top of the bed plate 8 and upon the other end portion of the shaft 21 is securely mounted a gearwheel 24 which engages with a pinion 25 which is securely mounted on a shaft 26 which is rotatably disposed in bearings 27 which are integrally associated with the supports 9, and upon the end portion of the shaft 26 adjacent to the pinion 25 is securely mounted a pulley 28 adjacent to which is freely mounted a loose pulley 29. Thus if a moving belt be shifted from the loose pulley 29 to the securely mounted pulley 28 rotary motion will be communicated to the sleeve 16 by means of the shaft 26, pinion 25, gearwheel 24, shaft 21, pinion 20 and beveled gearwheel 18.

The upper end portion of the sleeve 16 is provided with an integral flange 31 upon the upper side of which is concentrically and securely mounted the flange 32 of the hub-portion 33 of a cast-iron wheel 34, which hub-portion 33 is hollow to provide an annular space around the pivotal shaft 10, and extending radially from said annular space to peripheral portions of said wheel 34 are a plurality of passageways 35 for steam, which passageways 35 radiate on lines at equal degrees apart.

As shown more clearly in Fig. 3, on the several peripheral portions of the wheel 34 at points opposite the entrances to the passageways 35 are secured can receptacles 36 each of which is provided with a passageway 48 through its side which registers with a respective one of the passageways 35 in the wheel 34 whereby steam may pass from the passageway 35 into the respective one of the can receptacles 36, and, as more clearly shown in Figs. 2 and 3, within the annular space between the pivotal shaft 10 and the inner surface of the hollow hub portion 33 is disposed an annular valve 37 which is secured by a key pin 47 in a fixed circumferential position on the pivotal shaft 10 to rest on the intermediate shoulder 30 thereof. Extending around the periphery of said annular valve member 37 are two grooves within which are disposed packing rings 38, as more clearly shown in Figs. 2 and 5, whereby a steam tight joint may be formed between the peripheral surface of said annular valve member 37 and the inner surface of the hollow hub portion 33.

The hollow space within the pivotal shaft 10 is divided into two chambers 39 and 40 by an obliquely disposed integral partition 41 and through the wall of the hollow pivotal shaft 10 at opposite points thereof are passageways 42 and 43, the passageway 42 of which leads into a recess 44 in the valve member 37, said recess 44 consisting of a groove formed in the central portion of the periphery of said valve member 37 to extend therearound for more than half of the circumferential distance thereof, as more clearly shown in Fig. 3, whereby such recess 44 may always communicate with at least seven, and at times eight, of the twelve passageways 35 as the wheel 34 is revolved thus to permit steam to flow from the chamber 39 into seven or eight of the can receptacles 36 at the same time.

The oppositely disposed passageway 43 leads from the chamber 40 into a passageway 45 which extends upwardly to communicate with a concentrically annular recess 46 disposed in a plane above the recess 44 within said valve member 37 and said recess 46 is provided with a concentrically disposed circular slotted opening 47 which extends upwardly to the top surface of valve member 37.

As shown in Fig. 3, the valve member 37 is provided with a passageway 49 (of very small cross-section) disposed to extend radially from the chamber 40 to the periphery of said valve member 37 in a plane registering with the plane of the passageways 35 in the wheel 34, whereby, during the rotation of said wheel 34, the passageways 35 successively may communicate with the chamber 40 as they each arrive at the circumferential point where is located said passageway 49. As also shown in Fig. 3, said valve member 37 is provided with another passageway 50 extending between the passageway 45 and the periphery of the valve member 37 in the same plane with the passageways 35 of the wheel 34, and such passageway 50 has its outer end enlarged and elongated, as more clearly shown in Fig. 5, whereby as the wheel 34 is rotating the passageways 35 therein may successively communicate with the chamber 40, and between said passageway 50 and the adjacent end of the recess 44 in the periphery of said valve member 37 is a metal packing strip 51 which is disposed within a vertical recess 52 to extend between the packing rings 38, there being provided within said recess 52 a helical compression spring 53 whose force tends to press such packing strip 51 outwardly against the surface of the boring of the wheel 34 thus to prevent the leaking of compressed fluid between the outer end of the passageway 50 and the recess 44.

An internally projecting annular flange 54 which is integral with the top side of the wheel 34 is disposed to engage with the top surface of the valve member 37 thus to tightly close the circular slotted opening 47 which extends downwardly into the annular recess 46 and through such flange 54, in a circle registering with the circular slotted opening 47, extend a plurality of equi-distantly spaced screw-threaded holes within each of which is screwed a nipple, as nipples 55 shown in Fig. 2, and each of said nipples 55 is connected by a pipe 56 with that one of the can receptacles 36 which is on the same radial line with such nipple 55, whereby fluid may find passageway between the recess 46 to the interior of the can receptacle 36 through all of those nipples 55 which at any time are registering with the circular slotted opening 47.

Each of the can receptacles 36 is provided on its top and bottom portions with oppositely disposed and outwardly projecting guiding-lugs 57 that are integral therewith and the outer end portions of such lugs 57 are provided with vertical grooves which serve to guidingly support two vertically slidable rods 58 disposed therein one on each side of each of said can receptacles 36, the bottom end of each pair of said rods 58 being united by a yoke 59 integral with the upper side of which is a receptacle-closing plug 60 of cylindrical form which is provided with packing rings 61, which plug 60 is adapted, when raised by the rods 58, to enter and tightly close the open bottom end of the can receptacle 36 to make the interior space thereof tight under a high pressure of fluid.

The top surface of the plug 60 is provided with an upwardly projecting lip 62 which extends in a concentric circle for a portion of the distance therearound, such lip 62 serving to guide a can 63 to its concentric position on said plug 60, as shown in Fig. 7, which can 63 may be placed thereon to be carried thereby upwardly into the receptacle 36 where it may be subjected to heated fluid under a high pressure.

The upper ends of each pair of rods 58 are united by a yoke 64 and such yoke 64, as more clearly shown in Fig. 2, is provided with a pivot stud 65 which is disposed to project inwardly toward the center of the wheel 34 and on such inwardly projecting portion of said pivot stud 65 is rotatably mounted a roller 66 which is adapted to engage with and ride on a cam 67 that is associated with the outer edge of a cam-plate 68 which is fixed on the top end portion of the hollow pivotal shaft 10 with its flange-like hub 69 resting on the shoulder 14 of said pivotal shaft 10, whereby (when the wheel 34 is rotated in the direction indicated by the arrows in Figs. 1, 3 and 6) the roller 66, indicated on Fig. 6 by the circular dotted line, will be lowered and raised once in each revolution of the wheel 34 there being provided a depressing cam 70 integrally formed on the cam-plate 68 in a position immediately over the declined position of the cam 67, as shown at the right hand of the upper portion of Fig. 6, the underside of such depressing cam 70 being disposed to adapt it to engage with each of said rollers 66 as they successively travel down the said declined portion of the cam 67 and the operation of each roller 66 traveling down such declined portion serves to act through the vertically slidable rods 58 to lower the plug 60, with a can 63 resting thereon, out of the receptacle 36 to the position shown in Fig. 6 and during the travel of the wheel 34 to carry a receptacle 36 from the position shown in Fig. 6, in a horizontal plane to the bottom of the incline of the cam 67 shown on the right hand side of Fig. 6, a can 63 that has been treated is removed and another can 63 to be treated replaces the treated can 63 in response to the operation of mechanism, more clearly shown in Fig. 7, which will hereinafter be described, and a continuation of the rotary movement of the wheel 34 will cause the roller 66 to ride up the said incline of the cam 67 to carry the can 63, to be treated, upwardly into the receptacle 36 where it will be inclosed by the plug 60 during its travel around the axis of the cam-plate 68 to that point where the cam 67 begins to decline, at which point the depressing cam 70 will act on the top portion of the periphery of the roller 66 to move the rods 58 downwardly to the position shown in Fig. 6 in an obvious manner.

Projecting upwardly from the top side of the cam-plate 68 and integral therewith are three lugs, like the lug 71 in Fig. 2, which three lugs 71 are indicated by dotted lines in Fig. 1, and upon the top of such three lugs 71 is mounted a frame 72 to the outer ends of which, as shown in Fig. 1, is integrally attached a rim 73 of the form of a segment of a circle which rim 73 is disposed concentrically with the wheel 34 and which is provided with a downwardly projecting flange 74, as shown in Fig. 2, the inner surface of such flange 74 serving to engage in a cam-like manner with the upwardly projecting ends of levers 75 whose lower ends are pivotally articulated with lugs that are integrally provided on the upper portion of each of the can receptacles 36, whereby, as the wheel 34 revolves then said levers 75 will successively engage with the inner side of said flange 74 and thus be caused to swing their top end portions inwardly toward the center of the wheel 34.

As shown in Fig. 2, each of the levers 75 on its inner side of its upper portion is provided with a shoulder 76 which serves as a lock for locking the yoke 64 in its uppermost position when the lever 75 is forced inwardly in response to its engagement with the inner surface of said flange 74, thus to lock the plug 60 in its closed position within the can receptacle 36.

As shown more clearly in Fig. 1, the flange 74 of the rim 73, at its end indicated by the numeral 77, is bent outwardly in order to engage with the levers 75 when such levers 75 are in their outermost positions, whereby each of said levers 75, in its travel, as it engages with the outwardly turned end 77 of the flange 74, is forced inwardly by a cam-like action to move in the true circle of the inner side surface of said flange 74 to the other end 78 of said flange 74 which flange 74 is indicated by a circular dotted line in Fig. 1, thus to maintain each of the plugs 60 locked in its closed position within its associated can receptacle 36 so long as the upper end of the lever 75 is in engagement with said flange 74.

As each of the levers 75, in its travel, reaches the end of the flange 78 and disengages therefrom it immediately engages with a cam-like arm 79 which throws it outwardly to unlock its engagement with the yoke 64 to permit such yoke 64 and its associated parts to be forced downwardly by the depressing cam 70 in an obvious manner, the cam-like arm 79 being integrally attached to the end of the rim 73.

The rim 73 is disposed in such relation to the cam-plate 68 that each of the can receptacles 36 will be closed by its plug 60 and locked at the time that its associated roller 66 arrives at the top of the incline on cam 67 and be maintained closed and locked until its said roller arrives at the top of the declined portion of said cam 67.

When a roller 66, in its continuous travel, arrives at the bottom of the declined portion of the cam 67 its associated plug 60 will be in its lowest position in order to permit the removal of a can 63 (whose treatment is finished) and the placing of another can 63 in the same position to be treated, such changing of cans being effected while said roller 66 is traveling from the lower end of the declined portion of the cam 67 to the lower end of the inclined portion thereof.

The mechanism for removing a can 63 from the plug 60 and then putting another can 63 thereon is illustrated in Figs. 1, 2, 6 and 7 and may be described as follows: Attached to the bearing block 22 by means of a screw 80, as shown more clearly in Fig. 7, is an arm 81 which projects upwardly for a distance and then is bent to extend in a horizontal plane to such position, as shown, as will adapt it to engage with a can 63 to serve as a cam to force such can 63 to move outwardly from the lip 62 for such distance as will cause such can 63, in its continued travel, to be engaged by a lever arm 82 which will normally be in the path of such can 63, which normal position is indicated by dotted lines in Fig. 7, and such lever arm 82 is mounted securely on the lower end of a shaft 83 which is rotatably mounted in a bearing bracket 84 to extend vertically upward through such bearing bracket 84 to project its upper end out of such bearing bracket 84 and upon such upwardly projecting end portion of such shaft 83 is fixed a curved lever arm 85 which extends from said shaft 83 in such normal position that it will be engaged by the lower portion of each of the moving receptacles 36, which receptacle 36 will force such lever arm 85 outwardly against the force of a helical spring 86 which is associated with said lever arm 85, shaft 83 and bearing bracket 84, which outward movement of such lever arm 85 will cause the lever arm 82 also to swing from its normal position to force the can 63, with which it will then be engaged, outwardly to slide it on to a moving conveyer belt 87 by which belt 87 such can 63 may be carried to a desired point of disposal.

The bearing bracket 84 is secured to a table 88 which is supported by an upwardly extended portion 89 which is integrally associated with the support 90 with which is associated the bearing 23, as more clearly shown in Fig. 2, and such bearing bracket 84 is provided with a guiding member 91 which is disposed to extend obliquely across and above the conveyer belt 87, its inner end terminating at a point which adapts such guiding member 91 to guide a can 63 from the moving conveyer belt 87 on to a plug 60 that may be passing such point.

The conveyer belt 87 is disposed to travel in a sunken path provided in the table 88 whereby its top surface will register with the top surface of the table 88, whereby a can 63 may move evenly from such belt 87 on to the top surface of a plug 60 when guided by the guiding member 91.

In order to facilitate and control the movements of successive cans 63 from the moving belt 87 to rest on the plug 60 we have provided a sprocket chain 92 certain links of which have an outwardly projecting finger, as the fingers 93, more clearly shown in Fig. 1, which fingers 93 are so spaced that any two adjacent fingers may span one of the cans 63, and said sprocket chain 92 is disposed on sprocket wheels 94 and 95, respectively, to travel thereon in response to the rotary movement of the sprocket wheel 94, which rotary movement is communicated to said sprocket wheel 94 through a vertically disposed shaft 96 upon the top of which it is mounted to rotate in a horizontal plane.

The lower end of the shaft 96 is provided with a bevel gearwheel 97 which meshes with a bevel gearwheel 98 that is mounted on a shaft 99 which is rotatably mounted in suitable bearings provided in the bearing blocks 22 and 23 and upon its outwardly projecting end is securely mounted a gearwheel 100 which meshes with a gearwheel 101 that is mounted on the shaft 21, thus a rotation of the shaft 21 causes the sprocket wheel 94 to revolve to move the sprocket chain 92 and rotate the sprocket wheel 95, which idly revolves on its pivot stud 102 which pivot stud 102 is fixed on an adjustably movable plate 103 which may be secured in a desired position by screw-bolts 104.

The axial positions of the shaft 96 and the pivot stud 102 are such as will dispose the sprocket chain 92 to travel so that the side of it which is adjacent to the cans moving on the belt 87 will be in an oblique line with respect to the path of the moving cans 63, as shown in Fig. 1, whereby the fingers 93 successively may engage with correspondingly successive ones of the moving cans 63 successively to force such cans 63 against the guiding member 91 and push them, one at a time, on to successive ones of the passing plugs 60 in an obvious manner, and as each can 63 is deposited on such plug 60 the roller 66 will commence to ascend the inclined portion of the cam 67 and upon the arrival of said roller 66 at the top of such inclined portion the plug 60 with its can 63 will have entered its receptacle 36 and locked therein by the lever arm 75 to be carried around its circular path to the top of the declined portion of the cam 67 whereupon the roller 66 descending such declined portion will operate to lower the plug 60 to the position shown in Fig. 7 whereupon the arms 81 and 82 will coact in an obvious manner to remove the can 63 on to the belt 87, which moves in the direction of the arrows shown in Fig. 1, to carry can 63 to a desired point of disposal.

Adjacent to the path of the can 63 on the side opposite the sprocket chain 92 is a guide arm 107 which is pivotally mounted on the table 88 by a pivot stud 108 in such position as to be normally parallel with the sides of the moving cans 63, the free end of said guide arm 107 being slightly curved away from said can 63 and near such curved end is provided a helical spring 109 which is so disposed and supported by suitable means to adapt it to exert its force against said guide arm 107 thus to give resiliency to such guide arm 107 whereby if one of the fingers 93 of the sprocket chain 92 should not properly engage with a can 63 thereby to bind a can 63 between the end of a finger 93 and the guide arm 107, then such guide arm 107 would yield and move sufficiently to permit such can 63 to assume a proper position with respect to other cans 63 on the belt 87.

Extending upwardly out of the top of the chamber 39 of the hollow pivot shaft 10 is a pipe 105 which leads to a source of supply of steam under high pressure and extending downwardly from the bottom of the chamber 40 is an exhaust pipe 106 that may lead into any suitable drain; and under normal operation the chamber 39 and the recess 44 of the valve member 37 are constantly supplied with steam under high pressure, and in the operation of the machine when a receptacle 36, as the receptacle 36$^A$ in Fig. 3, arrives at a point registering approximately with the top end of the inclined portion of the cam 67 then steam will flow from the recess 44 through passageway 35 into said receptacle 36$^A$ which has locked within it a can 63 to be treated, and such steam may find a very small passageway from such receptacle 36 through the pipe 56 and nipple 55, through the slotted opening 47, thence into the annular recess 46, thence through the passageway 45 into the chamber 40 to escape therefrom through the pipe 106, whereby there will be a constant circulation of steam under high pressure through said receptacle 36$^A$ until such receptacle arrives at the position of the receptacle 36, marked 36$^B$ in Fig. 3, whereupon in its travel the passageway 35 is closed by the valve member 37 until such passageway 35 arrives at a point where it may connect with a passageway 50, through which passageway 50 the steam remaining in such receptacle 36$^B$ may escape through passageway 45 into the chamber 40 to find its way therefrom through the pipe 106, and at the same time the plug 60 with its can 63, in said receptacle 36, will undergo the operation of being lowered downwardly by the action of the cam-like flange 70 on the roller 66 to the position shown in Fig. 6, whereupon it may be removed on to the belt 87 in the manner described.

When a can 63 is first disposed on a plug 60 and such plug 60 is being entered into its receptacle 36 as its roller 66 is ascending the inclined portion of the cam 67 the air in said receptacle 36 is being compressed and in order to relieve such compression we provided a passageway 49 in the valve member 37, as more clearly shown in Fig. 3, so that when the passageway 35 registers with said passageway 49, just before said receptacle 36 arrives at the position of receptacle 36$^A$, then such compressed air may find escape into the chamber 40 through such passageways 49, whereby little air will be contained in said receptacle 36 when its passageway 35 connects with the recess 44 to admit steam into said receptacle 36.

All the cans 63 are subjected to the temperature of steam of high pressure during their travel from the position indicated by the receptacle 36$^A$, of Fig. 3, to the position indicated by the position of the receptacle 36$^B$, and during the travel of a receptacle 36 from the position indicated by the receptacle 36$^B$ to the position indicated by the position of the receptacle 36$^A$ the can 63 treated is removed from the plug 60 and replaced by another can 63 to be treated, in the manner already described.

Fig. 8 is a view in horizontal section on broken line $y, y$ of Fig. 2, showing a modified form of the valve member 37, a plan view of the same being shown in Fig. 9, and in such modified form in place of the passageway 49 of Fig. 3 we have substituted a passageway 110 disposed to extend from the center of the periphery of the valve member on a radial line to communicate with a vertical hole 111 which extends upwardly to the top surface of the valve member; which hole 111 may be provided with a screw-thread to adapt it for being connected with a conducting pipe (not shown) which may lead to an air pump whereby, as the wheel 34 revolves, when one of the passageways 35 leading to a receptacle 36 is passing the entrance to the passageway 110 then such air pump (not shown) may operate to exhaust the air from the interior of such receptacle and from a can disposed therein. Such modified form may be preferable when the machine is to be used for cooking certain kinds of food products, as for instance, fish, while the form shown in Fig. 3 may serve adequately when the machine is to be used for cooking other food products, as for instance, berries and other fruit.

Manifestly many changes may be made in the forms, dispositions and arrangement of the parts of our invention without departing from the spirit thereof.

What we claim is:

1. In a machine of the class described, the combination with a supporting frame, of a fixed hollow shaft secured to the top of said supporting frame to project upwardly therefrom, the hollow space within said fixed shaft being divided into an upper chamber and a lower chamber by an integral partition; a steam supply pipe communicating with the upper chamber of said fixed shaft; an escape pipe connected with the bottom portion of the lower chamber of said fixed shaft; a stationary valve-member of annular form fixed securely on said fixed shaft at a point registering with said partition therein, said valve-member being provided with a recess in a segmental portion of its periphery and with an annular recess in a position above said peripheral recess, and with a slotted opening of the form of the segment of a circle concentrically disposed to extend from the top surface thereof into said annular recess; a passageway extending between said annular recess and the lower chamber of said fixed shaft; a passageway between the upper chamber of said shaft and said peripheral recess; a passageway of small cross-section extending from the periphery of said valve-member to the lower chamber of said fixed shaft in a radial line near one end of said peripheral recess; another passageway of larger cross-section extending on a line near the other end of said peripheral recess to communicate with the lower chamber of said fixed shaft; a wheel rotatably and concentrically disposed on said valve-member, the hub portion of said wheel being bored to fit the periphery of said valve-member and to provide an annular inwardly projecting top flanged portion for covering said slotted opening in the top of said valve-member, said wheel being provided with a plurality of passageways extending radially through it from its periphery to the periphery of said valve-member; means for communicating rotary motion to said wheel; a plurality of can receptacles, each adapted by suitable means to inclose a can within it, each of said can receptacles being secured to the periphery of said wheel in a position registering with a different one of said passageways extending radially therethrough and each provided with a passageway communicating with the adjacent radial passageway in said wheel; a steam pipe disposed to adapt it to conduct steam for intermittent periods of time between said annular space in said valve-member and the interior space within each of said can carriers; a suitably supported cam-plate disposed above and adjacent to the path of said can receptacles; and power driven mechanism associated with said cam-plate and said can receptacle whereby each of said can receptacles may be opened and closed to remove one can therefrom and to place another can therein during its travel from one circumferential point to another.

2. A machine of the class described, which embodies a supporting frame, a fixed hollow shaft secured to the top surface of said supporting frame to project vertically upward therefrom; a wheel associated with said fixed shaft and adapted to be rotated therearound in a horizontal plane; a plurality of can receptacles secured at equi-distant points on the periphery of said wheel each of said can receptacles being provided with an opening through its bottom end through which opening a can may pass; a plug for each of said can receptacles, said plug being formed to adapt it to be disposed in said opening in the bottom end of its receptacle to cause such receptacle to be closed to hold steam therein under high pressure; means associated with each of said receptacles whereby air therein contained may escape therefrom during the operation of inserting its said plug into said opening in its bottom end; means for causing steam to circulate through the interior of each of said receptacles; and mechanism associated with the plug of each of said receptacles and with said supporting frame whereby said plug may be inserted within and extracted from said opening in the bottom end of its receptacle during the travel of said receptacle between two points in its circular path in response to the rotation of said wheel.

3. A machine of the class described, which embodies a plurality of revoluble can receptacles each having an opening in its bottom end through which a can may pass into and out from its interior, a plug formed closely to fit within said opening and adapted to be inserted therein and to be withdrawn therefrom; guiding lugs disposed on each of opposite sides of each of said receptacles; two connecting rods slidably disposed in the guiding lugs of each of said receptacles and having their lower ends secured to said plug at opposite sides thereof; a connecting yoke secured to the upper ends of each pair of said connecting rods; a roller pivotally mounted on each of said yokes to project from one side thereof; and a suitably supported fixed cam disposed in the path of said rollers and formed to lower and raise said rollers during the passage of said receptacles between two points in the circular path traveled by said receptacles, whereby said plugs may be forcibly withdrawn from and reinserted within said openings in the bottoms of said receptacles.

4. A machine of the class described, which embodies a plurality of revoluble can receptacles each having an opening in its bottom end through which a can may pass into and out from its interior, a plug removably disposed closely to fit within said opening, and means for permitting air to escape from the interior of said receptacle during the operation of inserting said plug into its position within said opening tightly to close said receptacle.

5. A machine of the class described, which embodies a plurality of removable can receptacles each having an opening in its bottom end through which a can may pass into and out from its interior; mechanism for causing said can receptacles to move in a circular path; a plug for each of said receptacles, said plug being removably disposed closely to fit the opening within said receptacle; and automatic means operatively associated with said mechanism whereby a can may be disposed on said plug at required times to be carried thereby into said receptacle in response to the operation of said mechanism.

In witness whereof we hereunto subscribe our names.

EUGENE T. HOSKINS.
JOHN H. BURPEE.

Signed by Eugene T. Hoskins on this 16th day of December, 1914, at Seattle, Washington, in the presence of—

O. JOHNSON,
FRANK WARREN.

Signed by John H. Burpee on this 19th day of January, 1915, at Bellingham, Washington, in the presence of—

FRANK H. JARVIS,
JOHN DYLE.